(12) United States Patent
Kent-Fawkes

(10) Patent No.: US 7,431,362 B2
(45) Date of Patent: Oct. 7, 2008

(54) CARTON HOLDER

(76) Inventor: Rod Kent-Fawkes, 380 Buss Ave., Parksville, British Columbia (CA) V9P 1L6

( * ) Notice: Subject to any disclaimer, the term of this patent is extended or adjusted under 35 U.S.C. 154(b) by 0 days.

(21) Appl. No.: 11/279,380

(22) Filed: Aug. 1, 2006

(65) Prior Publication Data
US 2008/0012368 A1 Jan. 17, 2008

Related U.S. Application Data

(60) Provisional application No. 60/672,468, filed on Apr. 19, 2005.

(51) Int. Cl.
*A47G 23/02* (2006.01)
*B65D 23/10* (2006.01)
(52) U.S. Cl. .................... 294/32; 16/425; D7/622
(58) Field of Classification Search ........... 294/27.1, 294/31.2, 32, 33; D7/622, 623; 248/311.2, 248/145.6; 215/396; 16/425, 430
See application file for complete search history.

(56) References Cited

U.S. PATENT DOCUMENTS

| | | | | |
|---|---|---|---|---|
| D188,706 S | * | 8/1960 | Sircovics | D7/622 |
| 2,961,121 A | * | 11/1960 | Bergey | 220/741 |
| 3,056,534 A | * | 10/1962 | Kasper, Sr. et al. | 294/32 |
| 3,151,792 A | * | 10/1964 | Garland, Jr. | 294/32 |
| 3,458,164 A | * | 7/1969 | Massey | 248/145.6 |
| D292,160 S | * | 10/1987 | Thomas | D7/622 |
| D309,072 S | * | 7/1990 | Golkar | D7/622 |
| D350,069 S | * | 8/1994 | Quarberg et al. | D7/622 |
| 6,979,031 B2 | * | 12/2005 | Coppotelli et al. | 294/27.1 |

* cited by examiner

*Primary Examiner*—Dean J Kramer
(74) *Attorney, Agent, or Firm*—Gordon Thomson

(57) ABSTRACT

A carton holder is adapted to hold a generally square carton and comprises a bottom sleeve adapted to accept the flat bottom surface of the carton; a top grasping member adapted to exert compressive forces against the outside surface of the carton to firmly holding the carton in a stable configuration within the carton holder; and a handle. The carton holder is specifically designed for use in combination with beverage cartons by persons with reduced hand strength and motor skills due to age, infirmities and disease.

13 Claims, 5 Drawing Sheets

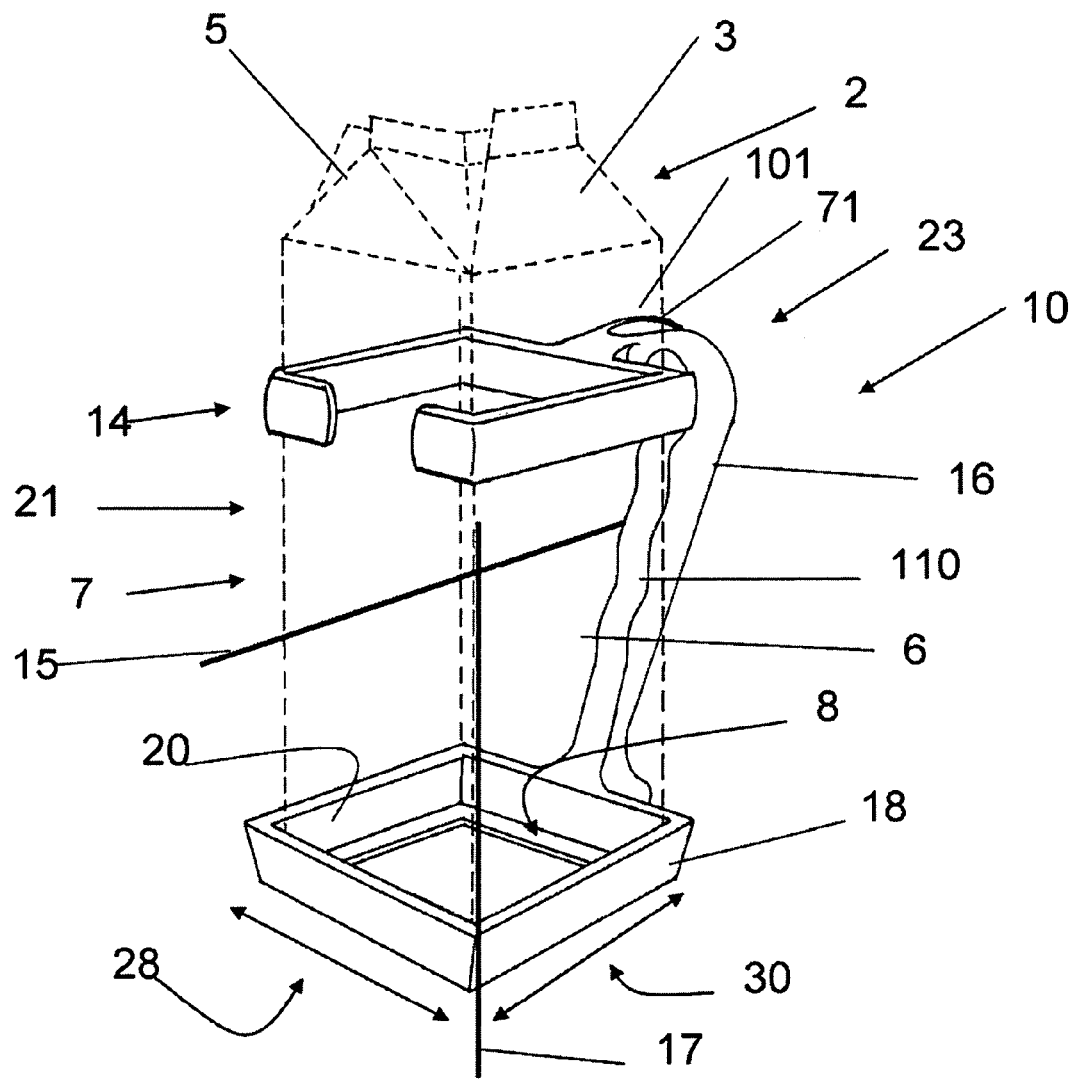

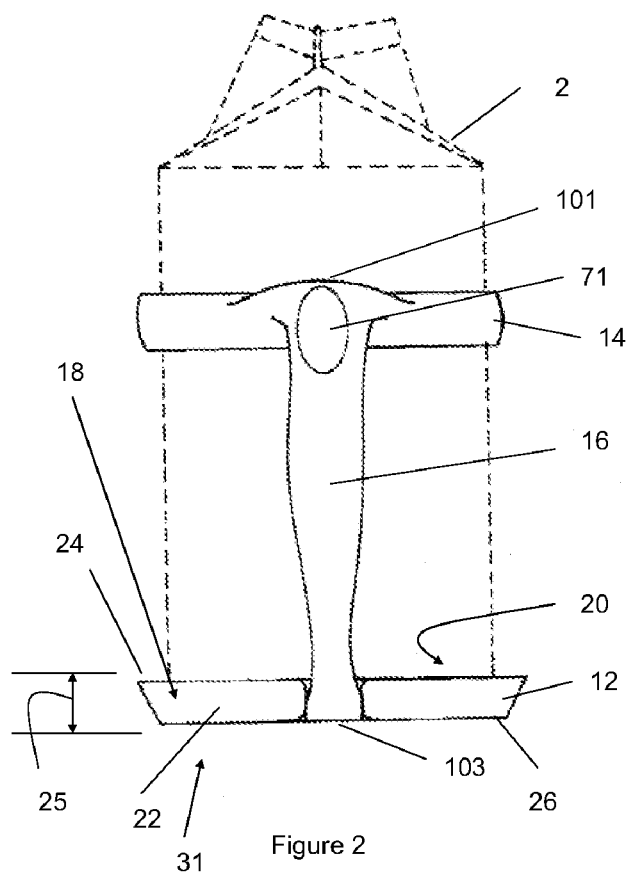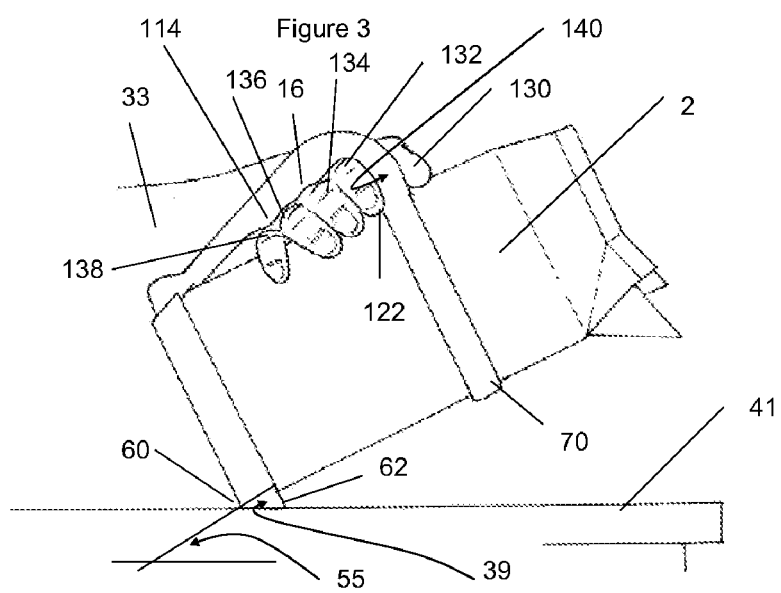

CARTON HOLDER

CROSS-REFERENCE TO RELATED APPLICATIONS

Applicant is entitled to the benefit of Provisional Patent Application Ser. No. 60/672,468 filed on Apr. 19, 2005.

DESCRIPTION

This invention relates to the field of hand manipulated handling devices and more specifically a handling device adapted for cartons particularly for containing beverages.

DISCUSSION OF THE PRIOR ART

There are many infirmities related to aging, injury and disease which result in a reduction of motor skills and limb strength particularly in the arms and hands. For example, arthritis, carpel tunnel syndrome, muscular dystrophy and injury induced paralysis often restrict the ability of individuals to grasp and firmly hold objects such as smooth surfaced cartons containing milk. Furthermore, the height, considerable width and weight of containers, such as 1, 1.5 and 2 liter-sized cartons, make it difficult for weakened individuals to manipulate such cartons safely.

The prior art discloses a number of devices that are designed to aid individuals to grasp, lift and carry bottles, beverage cans and like containers. Examples include U.S. Pat. No. 5,806,904 issued to Smith on Sep. 15, 1998; U.S. Pat. No. 5,695,232 issued to Iipp on Dec. 9, 1997; U.S. Pat. No. 5,183,169 issued to Grzych on Feb. 2, 1993; and, U.S. Pat. No. 6,378,924 issued to McCumb on Apr. 30, 2002. However, all of these devices are not well adapted for use by persons who have diminished strength and motor skills due to age, injury or disease. Furthermore, these devices do not facilitate the safe manipulation of large square cartons by such persons.

Therefore, there continues to be a need for a carton holder that is able to conveniently hold and permit carriage and manipulation of a large carton by an individual with reduced or weakened hand strength.

OBJECTS OF THE INVENTION

It is a principle object of the present invention to provide a carton holder that overcomes the deficiencies noted above.

Another object of this invention is to provide a carton holder that is specifically designed for individuals that have reduced hand strength due to age, injury or disease.

It is a further object of the invention to provide a carton holder that is comfortable and safe to use by persons with weakened hand strength.

It is yet another object of the invention to provide a carton holder that is lightweight, easy to manufacture and inexpensive to purchase.

SUMMARY OF THE INVENTION

The invented carton holder is designed for use with a beverage carton having a substantially square bottom.

The carton holder comprises a square base adapted to accept and firmly seat the bottom of the carton. The base comprises a sleeve having an annulus, a height, an inside wall, an outside wall, a flat top surface and a flat bottom surface. The holder also comprises two arms for firmly grasping the carton within the carton holder and a handle.

The sleeve inside wall is vertical and the sleeve outside wall has an acclivity away from the vertical.

In order to facilitate a controlled pouring operation by a person with weakened hand strength, there is a first pivot point located at the junction of the front of the flat bottom surface of the sleeve and the front bottom end of the sleeve outside wall and a second pivot point is located at the front top of the sleeve outside wall. The first pivot point is adapted to pivot, on a flat stable surface such as a table top, the carton holder Y-axis from a first vertical position to a second position wherein the carton holder Y-axis is at an angle of no more than 45 degrees from the vertical. The second position is an intermediate stable position whereby the carton is resting on the flat front of the outside wall of the sleeve. The second pivot point is adapted to pivot the carton holder Y-axis from the second position to a pouring position.

The grasping arms are formed from an open square having a front facing gap, a back end fixed to the handle top end and an inside width. The arms have an inherent resiliency so that when the carton is placed within the square the arms will have an inherent tendency to flex outwardly to accommodate the slightly larger width of the carton and subsequently exert a compressive force against the outside surface of the carton thereby firmly grasping it.

BRIEF DESCRIPTION OF THE DRAWINGS

The foregoing and other objects, features and advantages of the invention will be apparent from the following more particular description of the preferred embodiments of the invention as illustrated in the accompanying drawings in which like reference characters refer to the same parts throughout the different views. The drawings are not necessary to scale, emphasis instead being placed upon illustrating the principles of the invention.

FIG. 1 is a perspective front view of one embodiment of the invention shown in combination with a carton.

FIG. 2 is a back view of another embodiment of the invention shown in combination with a carton.

FIG. 3 is a side view of the invention showing the combined carton holder and carton pivoting about a first pivot point with the hand in a slide grip position.

DETAILED DESCRIPTION OF THE PREFERRED EMBODIMENT

Figure 4:
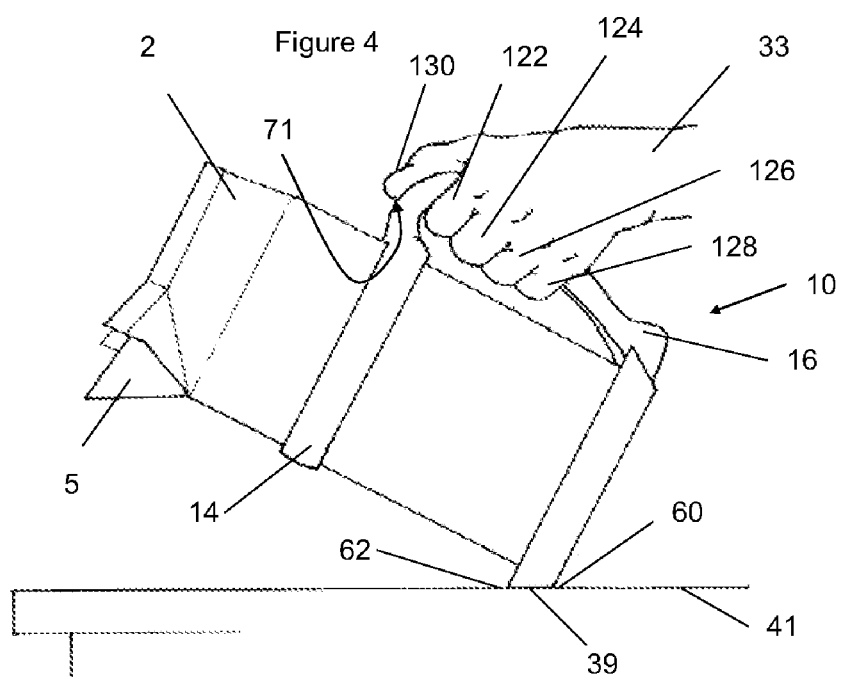
FIG. 4 is a side view of the same embodiment of the invention as FIG. 3 showing the combination carton holder and carton manipulated by a hand in a pistol-grip grasp about the handle.
Figure 5:
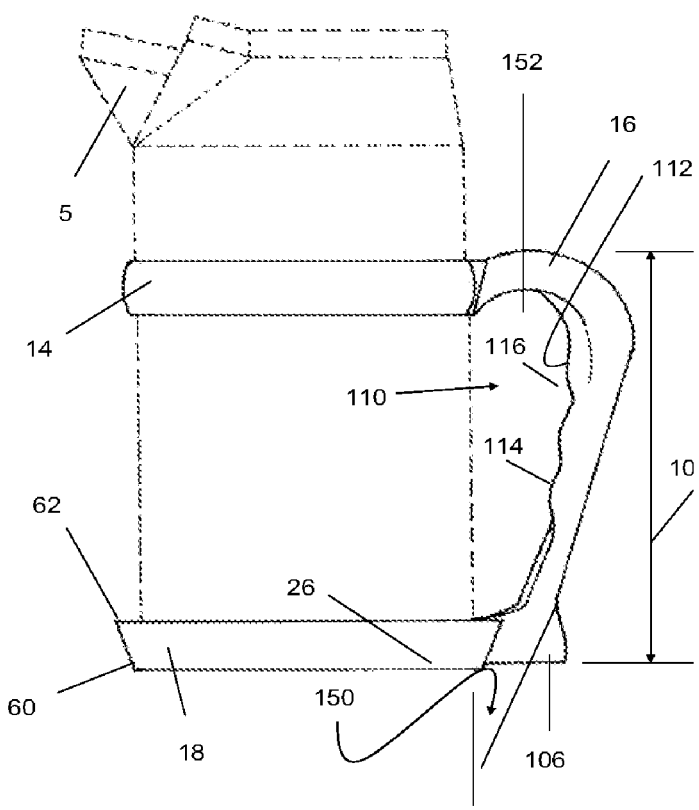
FIG. 5 is a side view of another embodiment of the invention shown in combination with a carton.
Figure 6:
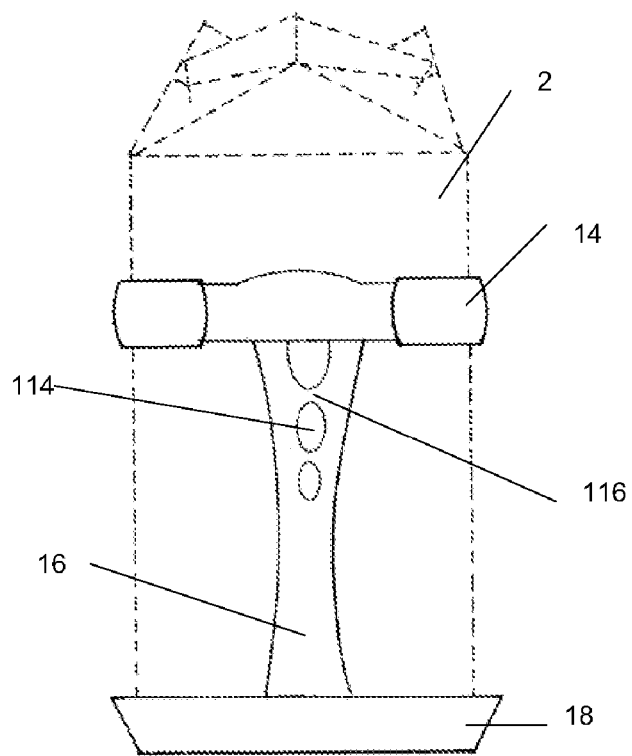
FIG. 6 is a front view of one embodiment of the invention shown in combination with a carton.
Figure 7:
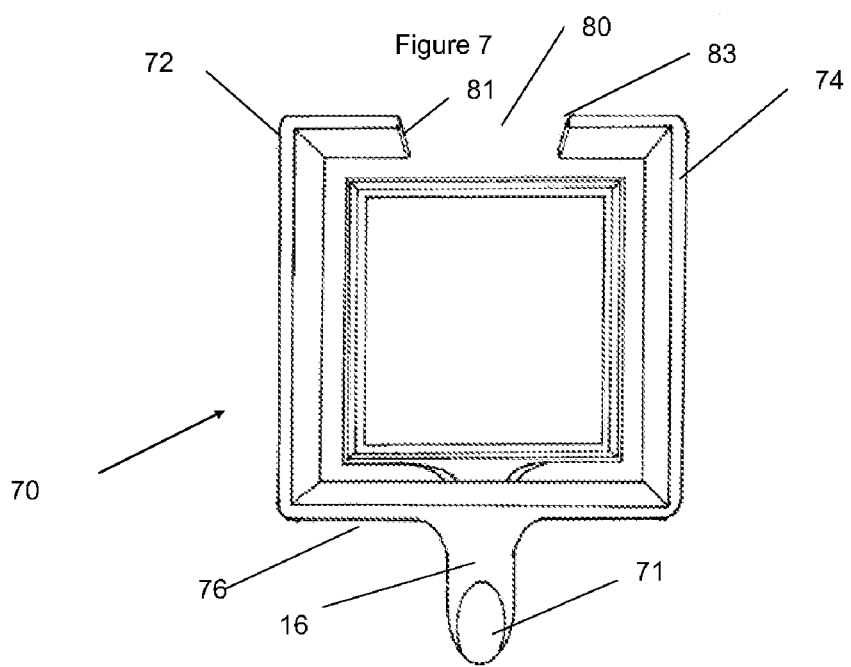
FIG. 7 is a top view of one embodiment of the invention.
Figure 8:
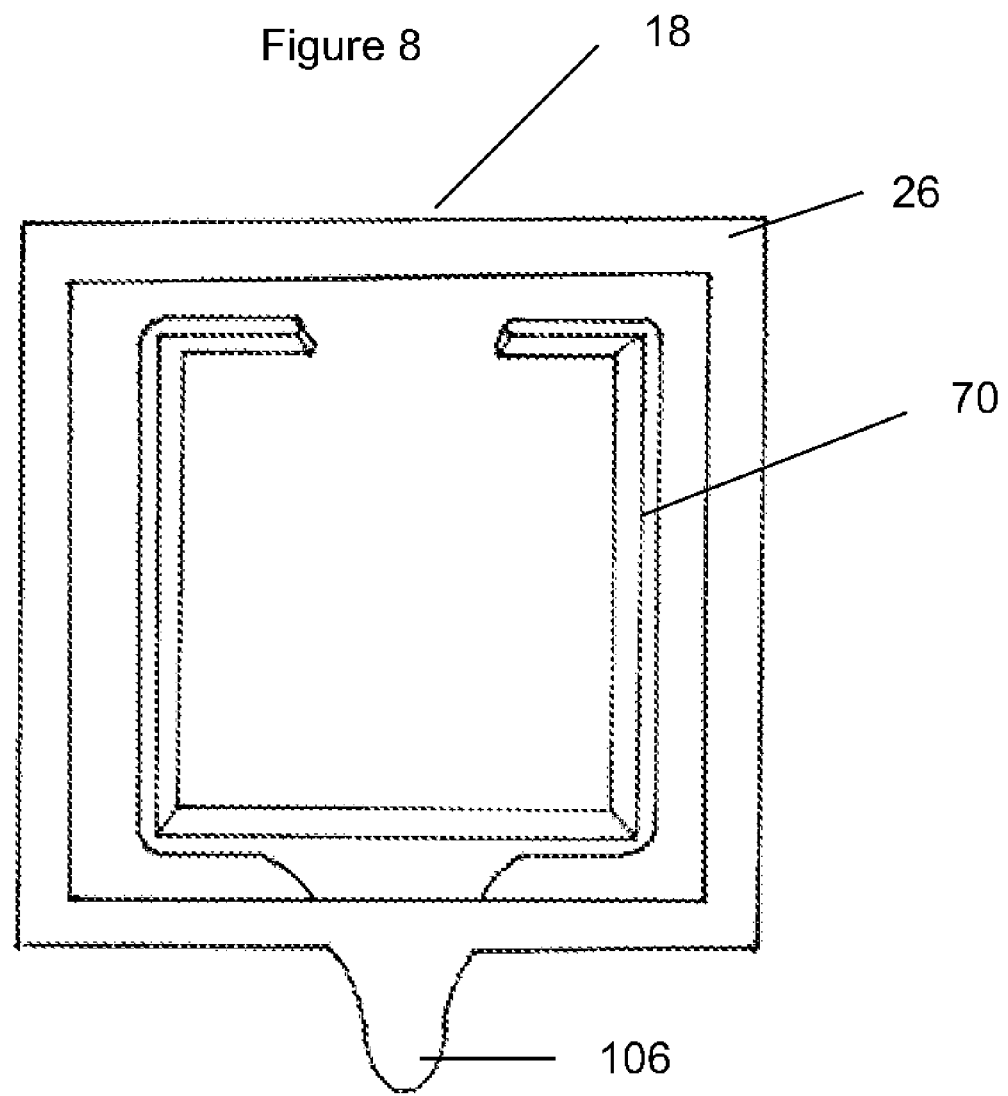
FIG. 8 is a bottom view of one embodiment of the invention.

Referring to FIG. 1, there is a perspective front view of one embodiment of the invention (10), being a carton holder shown in combination with a typical beverage carton such as a milk carton (2). For orientation purposes, there is shown an X axis (15) and a Y axis (17). The carton and carton holder have a front (21) and a back (23).

The carton may have any volume but generally the size of carton contemplated by this invention is between 1 and 2 liters. The invented carton holder may be sized to accommodate such cartons. The carton holder can be dimensioned for any sized carton of the type contemplated herein. Typically, a carton (2) is adapted to contain non-pressured beverages such as milk or juice. The carton (2) typically has a top portion (3), a spout (5), and a body portion (6) with sidewall (7) and a carton seating surface (8) comprised of four carton supporting surfaces.

Referring now to FIGS. 1 and 2, the carton holder (10) is shown in side view combination the carton (2). The carton holder is adapted to securely grasp and hold a carton in order to meet the objectives of the invention. The preferred embodiment of the carton holder shown in FIG. 2 comprises base means (12) adapted to securely seat the bottom of the carton therein, carton grasping means (14) adapted to firmly grasp the carton body portion and hold it within the invention and handle means (16) disposed between and connecting together the carton grasping means (14) and base (12). The handle means allows the user to use the carton holder in a slide-grip and pistol-grip fashion as explained below.

Referring to FIG. 1 and FIG. 2, base means comprises a square sleeve (18) having an annulus (31), an inside surface (20) comprising four vertical walls, an outside surface (22) comprising four inclined walls, a top surface (24) and a bottom surface (26). The sleeve has a height (25). Top surface (24) is flat. Bottom surface (26) is also flat and provides overall stability on the X-axis (15) and about the Y axis (17) of the invention when holding a carton as depicted in FIG. 1. Annulus (31) has a generally square shape having a generally equal length (28) and width (30). Sleeve inside surface (20) is vertical and adapted to engage in a contacting relationship the outside surface of the carton resulting in carriage of the weight of the upright carton by the sleeve bottom surface.

Referring now to FIG. 1 and FIG. 3, there is shown the invented carton holder in combination with a carton. The hand (33) is inserted between the handle (16) and the carton (2) in a slide-grip fashion. The slide-grip is used when the individual does not have the hand strength or motor skills necessary to firmly grasp the handle in a pistol-grip fashion. The weight of the carton holder and carton combination is balanced on the dorsal side of the hand as illustrated in FIG. 3 and the force required to move the carton holder and carton combination from a vertical position to a pouring position and back to a vertical position can be provided by the arm and shoulder. In FIG. 3, the front inclined outside wall (39) of the sleeve (18) is linear and flat against table surface (41). It has a slope angle (55) that facilitates tipping the carton holder and carton combination forwards along the X axis (15) in order to pour the contents of the carton into a receptacle. First pivot point (60) is located at the bottom of the front outside wall (39) and second pivot point (62) is located at the top of the front outside wall (39). An angle (55) of less than 45 degrees from the vertical or greater than 45 degrees from the horizontal is appropriate as it permits tipping of the combination in a controlled fashion about the first pivot point (60) but prevents tipping of the combination about the second pivot point (62) unless additional force is exerted on the combination by the individual. The second pivot point (62) is adapted to pivot the carton holder and carton combination from the stable intermediate position to a third pouring orientation that is greater than 45 degrees and less than 90 degrees from the horizontal.

Referring now to FIG. 4, the combined carton holder and carton is shown when the carton holder is gripped in a pistol-grip fashion. Front outside wall (39) is flat against the surface (41). The combined carton (2) and carton holder (10) are shown having passed the first pivot point (60) but not the second pivot point (62). Spout (5) is open to pour the contents of the carton. In the pistol-grip the thumb (130) of the hand (33) is placed on the notch (71) adapted to receive it. The fingers of the hand (122), (124), (126) and (128) are wrapped around handle (16). Additional forward motion from the arm and shoulder of the user is sufficient to move the carton and holder about pivot point (62) to affect a pour.

Referring now to FIG. 1 to FIG. 8, carton grasping means (14) is adapted to firmly grasp the carton and hold it within carton holder. Grasping means (14) comprises an open square (70) having an open front end thereby forming gap (80). The open square is defined by a first arm (72) and a second opposing arm (74). The back portion (76) of the square (70) is fixed to the top end of the handle (16) and integral therewith. The tips (81) and (83) respectively of arms (72) and (74) are in a confronting relationship with gap (80) between them. The inside width and length of the square are slightly smaller than the length and width of the carton it is intended to hold so that when a carton is placed within the square the arms will have an inherent tendency to flex outwardly to accommodate the slightly larger dimensions of the carton. Once the carton is inserted within square (70) the arms will exert a compressive force against the outside surface of the carton thereby firmly grasping it in a squeezing relationship.

Still referring to FIGS. 1 to 8 handle means (16) is described. Handle means (16) is an inclined member having a top end (101) and a bottom end (103). It has been ergonomically designed to permit manipulation of the combined carton and carton holder by a person with weakened hand strength caused by disease, accident or aging in a slide-grip as shown in FIG. 3 or in a pistol-grip fashion as shown in FIG. 4. Handle means (16) joins the base means (12) and grasping means (14). The length of handle means (100) is sufficient to permit the hand to grasp handle means as shown in FIG. 4 in a pistol-grip fashion and to permit the carton grasping means (14) to contact the carton held within the carton holder at a point near centre of gravity of a full carton for stability. The top end (101) of handle means (16) includes a notch (71) adapted to accommodate the curved profile of a human thumb pad which facilitates grasping and manipulation of the carton holder. The bottom end (103) of handle means includes a chin-shaped projection (106) that is about one inch in length along the X-axis. The bottom surface of the projection is flat and contiguous with the bottom surface (26) of sleeve (18). The purpose of the projection is to ensure stability about the X axis of the carton and carton holder combination by preventing a pivoting action about the bottom (103) of the handle when the carton is returned to an upright position. For example, as described previously, and referring to FIGS. 3 and 4, when the carton is returned from a pouring position to a vertical position, the individual with weak hand strength may not be able to adequately control the carton as it pivots about first pivot point (60) back to the vertical position. Therefore, the projection (106) exists to ensure that the combination carton and carton holder does not rotate backwards about the bottom of handle means.

Handle means (16) inside surface (110) includes a gripping surface (112) that includes a plurality of aligned alternating raised areas (114) and hollows (116) of diminishing size from top to bottom that are adapted to conform to the circumference of an individual's fingers when gripped in a pistol grip fashion as illustrated in FIG. 4. In the pistol gripping mode the palmal sides of the index (122), middle (124), ring (126) and small (128) fingers are in comfortable contact with the hollows and the thumb pad (130) is in contact with groove (71). The inside surface of handle means is sufficiently wide to comfortably distribute the weight of the carton and carton holder combination across the dorsal side of the individual's fingers.

As shown in FIG. 3, the raised areas (114) and hollows (116) are also adapted to conform to dorsal side of an individual's fingers when the carton holder and carton combination is being manipulated in a slide-grip fashion. In this gripping mode the dorsal side of the base of the metacarpals (132), (134), (136) and (138) of each finger is in contact with the hollows with the carpals (knuckles) (not shown) acting as an abutment against the grip. The thumb pad (130) is positioned at (140) on top of the handle at the point where square (70) joins handle means (16). To reduce stress in the thenar muscles between the thumb and the index finger (122) that control the thumb (129), square (70) is joined to the handle at a point slightly below the top (101) of handle means. This is illustrated in FIG. 3, where the top crest (101) of handle means is shown rising slightly above the back of square (70). Being able to use a slide grip permits the lifting and manipulation of a carton and carton holder combination as the weight of the carton is carried on the dorsal side of the hand and no grasping is required to control the carton.

Handle means (16) possesses an acclivity (150) that creates a void (152) between the inside surface (110) of handle means (16) and the outside surface of the carton (2) to permit the fingers of a person's hand to grasp handle means in either a pistol-grip or slide-grip fashion. The acclivity (150) is generally less than 30 degrees from the vertical but may be more or less in other possible embodiments of the invention.

The carton holder is manufactured by means of known injection molding techniques using known light weight and resilient materials that are capable of maintaining their resiliency when under cold temperatures. Injection molding permits easy and inexpensive manufacturing of the invention.

The invented carton holder and carton and carton holder combination are applicable in any situation where the gripability and ability to manipulate of a large carton needs to be augmented. It is advantageously applicable in situations where persons who have weakened hand strength and motor skills need to manipulate large cartons.

Although this description contains much specificity, these should not be construed as limiting the scope of the invention by merely providing illustrations of some of the embodiment of the invention. Thus the scope of the invention should be determined by the appended claims and their legal equivalents rather than by the examples given.

What is claimed is:

1. A carton holder for holding a generally square carton having a flat bottom, a top portion, a spout, and a body portion comprising four sides, wherein said carton holder comprises: a front and a back; an x-axis and a y-axis; a base adapted to accept and firmly seat said carton flat bottom, said base comprising a square sleeve having an annulus, an inside surface comprising four vertical walls, a carton seating surface comprising four supporting surfaces, an outside surface comprising four inclined walls including a front inclined wall comprising a first pivot point and a second pivot point; wherein said first pivot point is located at the bottom of said front inclined wall for pivoting the carton holder on a surface about said y-axis from a vertical orientation to a first stable and inclined orientation so that the front inclined wall sits upon said surface; and wherein said second pivot point located at the top of the front inclined wall for pivoting the carton holder y-axis from said first stable and inclined orientation to a second inclined pouring orientation; and further wherein the base comprises a height, a flat top surface and a flat bottom surface; carton grasping means disposed above the base and adapted to firmly grasp said carton body portion; handle means disposed between and joining the base and said carton grasping means, wherein said handle means is adapted for use in a slide-grip and pistol-grip fashion.

2. The carton holder as claimed in claim 1 where in the first inclined orientation the y-axis has an angle less than 45 degrees from the vertical position.

3. The carton holder as claimed in claim 2 where in the second inclined pouring orientation the y-axis has an angle greater than 45 degrees from the vertical position and less than 90 degrees from the vertical position.

4. The carton holder as claimed in claim 3 wherein said carton grasping means comprises a first arm and a second opposing arm forming an open square having an open front end comprising a gap.

5. The carton holder as claimed in claim 4 wherein said handle means comprises an inclined member having a top end and a bottom end, and wherein said open square has a back end and further wherein said back end is integral to said handle means and attached to the handle means below said member top end.

6. The carton holder as claimed in claim 5 wherein the carton is fitted within the open square and wherein the first arm and second opposing arm are adapted to exert squeezing forces on the body portion of the carton.

7. The carton holder as claimed in claim 6 wherein the handle means has an inside surface having a plurality of alternating raised areas and hollows of diminishing size from top to bottom so that the handle means can be grasped as a carton holder handle in a pistol grip fashion.

8. The carton holder as claimed in claim 7 wherein said handle means top includes an outside surface having a notch therein adapted to receive a thumb pad of a user when the handle means is grasped in said pistol grip fashion.

9. The carton holder as claimed in claim 8 wherein said plurality of alternating raised areas and hollows permit manipulation of the carton holder using a slide grip.

10. The carton holder as claimed in claim 9 wherein the handle means is inclined from the y-axis at approximately 30 degrees.

11. The carton holder as claimed in claim 10 wherein the handle means bottom end includes a chin-shaped projection that is adapted to stabilize the carton holder along the x-axis.

12. A carton holder for holding a generally square carton having a flat bottom, a top portion, a spout: a body portion having four sides, wherein said carton holder comprises; a front and a back; an x-axis and a y-axis; base means adapted to accept and firmly seat said carton flat bottom wherein said base means comprises a square sleeve having an annulus, an inside surface comprising four vertical walls, a carton seating surface comprising four supporting surfaces, an outside surface comprising four inclined walls including a front inclined wall having a first pivot point located at the bottom of said front inclined wall and a second pivot point located at the top of the front inclined wall, a height, a flat top surface and a flat bottom surface; carton grasping means comprising a first arm and a second opposing arm forming an open square having an open front end and a gap, wherein said open square is disposed above said base means and adapted to firmly grasp said carton body portion; handle means comprising a member inclined at approximately 30 degrees to the horizontal, said handle means having a top end and a bottom end, the handle means joining and disposed between the base means and said carton grasping means, wherein said handle means is adapted for use by a user in a slide-grip and pistol-grip fashion, and further wherein the inclined member has an inside surface having a plurality of alternating raised areas and hollows of diminishing size from member top to member bottom so that the member can be grasped as a carton holder handle using a pistol grip, and further wherein said handle means top includes an outside surface having a notch therein adapted to receive a thumb pad of a user when the handle means is grasped in said pistol grip fashion.

13. A carton holder combined with a carton, said carton having a flat bottom, a top portion, a spout, a body portion having four sides, wherein said carton holder comprises: a front and a back; an x-axis and a y-axis; base means adapted to accept and firmly seat said carton flat bottom wherein said base means comprises a square sleeve having an annulus, an inside surface comprising four vertical walls, a carton seating surface comprising four supporting surfaces, an outside surface comprising four inclined walls including a front inclined wall having a first pivot point located at the bottom of said front inclined wall and a second pivot point located at the top of the front inclined wall, a height, a flat top surface and a flat bottom surface; carton grasping means comprising a first arm and a second opposing arm forming an open square having an open front end and a gap, wherein said open square is disposed above said base means and adapted to firmly grasp said carton body portion; handle means comprising a member inclined approximately 30 degrees from the vertical, said member having a top end and a bottom end, wherein said top end includes a notch therein adapted for receiving the thumb pad of a user when grasping said handle means in a pistol grip, and wherein said bottom end includes a chin-like projection for stability along said x-axis, and further wherein the member joins and is disposed between the base means and said carton grasping means, and further wherein the member has an inside surface having a plurality of alternating raised areas and hollows of diminishing size from member top to member bottom end so that the member can be securely grasped by a user with a weak grip.

* * * * *